(12) United States Patent
Van Abbema et al.

(10) Patent No.: US 11,052,924 B2
(45) Date of Patent: Jul. 6, 2021

(54) TACTILE ASSEMBLY

(71) Applicants: TEIJIN ARAMID B.V., Arnhem (NL); ELITAC BV, Utrecht (NL)

(72) Inventors: Anneke Van Abbema, Rotterdam (NL); Wouter Vos, Amersfoort (NL); Jorrit Jong De, Arnhem (NL)

(73) Assignees: TEIJIN ARAMID B.V., Arnhem (NL); ELITAC BV, Utrecht (NL)

( * ) Notice: Subject to any disclaimer, the term of this patent is extended or adjusted under 35 U.S.C. 154(b) by 0 days.

(21) Appl. No.: 16/090,612

(22) PCT Filed: Mar. 31, 2017

(86) PCT No.: PCT/EP2017/057778
§ 371 (c)(1),
(2) Date: Oct. 2, 2018

(87) PCT Pub. No.: WO2017/174471
PCT Pub. Date: Oct. 12, 2017

(65) Prior Publication Data
US 2019/0111946 A1   Apr. 18, 2019

(30) Foreign Application Priority Data

Apr. 5, 2016 (EP) .................................... 16163843

(51) Int. Cl.
*B60N 2/58* (2006.01)
*B60W 50/16* (2020.01)
(Continued)

(52) U.S. Cl.
CPC .............. *B60W 50/16* (2013.01); *B60N 2/58* (2013.01); *B60N 2/70* (2013.01); *B60N 2002/981* (2018.02)

(58) Field of Classification Search
CPC ........... B60W 50/16; B60N 2/58; B60N 2/70; B60N 2002/981
See application file for complete search history.

(56) References Cited

U.S. PATENT DOCUMENTS 6,682,494 B1 * 1/2004 Sleichter, III .......... A61H 23/02
601/57
6,744,370 B1    6/2004 Sleichter, III et al.
(Continued)

FOREIGN PATENT DOCUMENTS

DE       102013211029 A1    12/2013

OTHER PUBLICATIONS

Jul. 14, 2017 International Search Report issued in International Patent Application No. PCT/EP2017/057778.
(Continued)

*Primary Examiner* — Philip F Gabler
(74) *Attorney, Agent, or Firm* — Oliff PLC

(57) ABSTRACT

A tactile assembly for a vehicle seat or for a cover placeable on a vehicle seat including at least one tactile actuator, at least two support layers and a matrix layer including at least one cavity, wherein the tactile actuator is arranged on a first support layer and the first support layer is arranged to extend into the cavity without being in contact with the bottom of the cavity and the actuator is arranged on the first support layer in the cavity such that it makes substantially no contact with the side walls or bottom of the cavity, and the opening of the cavity is covered by a second support layer, and to a tactile system and vehicle seats including the tactile assembly or the tactile system.

20 Claims, 2 Drawing Sheets

(51) Int. Cl.
   *B60N 2/70*   (2006.01)
   *B60N 2/90*   (2018.01)

(56) References Cited

U.S. PATENT DOCUMENTS

| | | | | |
|---|---|---|---|---|
| 7,681,949 B2 * | 3/2010 | Nathan | ............... | B06B 3/00 |
| | | | | 297/217.3 |
| 9,421,908 B2 * | 8/2016 | McQueen | ............... | G08B 6/00 |
| 2006/0255920 A1 * | 11/2006 | Maeda | ............... | B60N 2/0232 |
| | | | | 340/407.1 |
| 2007/0032752 A1 * | 2/2007 | Wu | ............... | A61H 23/0263 |
| | | | | 601/57 |
| 2008/0128190 A1 * | 6/2008 | Tsutsumi | ............... | B60Q 9/00 |
| | | | | 180/219 |
| 2013/0307302 A1 * | 11/2013 | Rockwell | ............... | B60N 2/7017 |
| | | | | 297/217.3 |
| 2014/0008948 A1 * | 1/2014 | Rockwell | ............... | B60N 2/002 |
| | | | | 297/217.3 |
| 2014/0318699 A1 | 10/2014 | Longinotti-Buitoni et al. | | |
| 2017/0297463 A1 * | 10/2017 | Yoshikawa | ............... | B60N 2/976 |

OTHER PUBLICATIONS

Jul. 14, 2017 Written Opinion issued in International Patent Application No. PCT/EP2017/057778.

* cited by examiner

TACTILE ASSEMBLY

The present invention pertains to a tactile assembly for a vehicle seat, especially to a tactile navigation and/or warning assembly, to a tactile system and to a vehicle seat comprising the tactile assembly or the tactile system.

Tactile assemblies for vehicle seats are known.

US2014/0008948 discloses a vibratory alert patch for vehicle seats. The seat includes a foam cushion and at least one motor assembly near the surface of the cushion. The motor assembly includes a plurality of transducer cells.

The foam cushion includes a preformed recess in which the vibratory alert patch is embedded. Alternatively, the transducer cells may be encapsulated in a rubber patch.

DE102013211029 A1 pertains to an alert system for a car having improved actuator fastening means. The seat comprises at least two actuators. The actuators are placed in a casing which in turn is embedded in a multi-stepped cavity of the upholstery which matches the shape of the casing.

U.S. Pat. No. 6,744,370 B1 is directed to a vibro-tactile alert and massaging system incorporated into a pad for a vehicle seat. The system includes a plurality of motorized vibrators. The system can be placed on a seat or be incorporated therein.

However, none of the known systems provides an actuator arrangement which allows highly localized and strong tactile signaling.

The aim of present invention is to provide an improved tactile assembly, especially with regard to providing strong and locally restricted signals to the occupant of the vehicle seat. In one embodiment, the signals are locally restricted in a manner to allow providing navigational instructions. Preferably, the tactile assembly provides tactile signals which are sufficiently specific to provide turn-by-turn navigational instructions to the user without using audio instructions.

The invention realizes this goal by providing a tactile assembly for a vehicle seat or for a cover placeable on a vehicle seat comprising at least one tactile actuator (5), at least two support layers and a matrix layer (1) comprising at least one cavity (2), wherein the tactile actuator (5) is arranged on a first support layer (3) and the first support layer (3) is arranged to extend into the cavity (2) without being in contact with the bottom of the cavity (6) and the actuator (5) is arranged on the first support layer (3) in the cavity (2) such that it makes no contact with the side walls or bottom of the cavity (6), and the opening of the cavity (7) is covered by a second support layer (4).

DETAILED DESCRIPTION OF EMBODIMENTS

Figure 1:
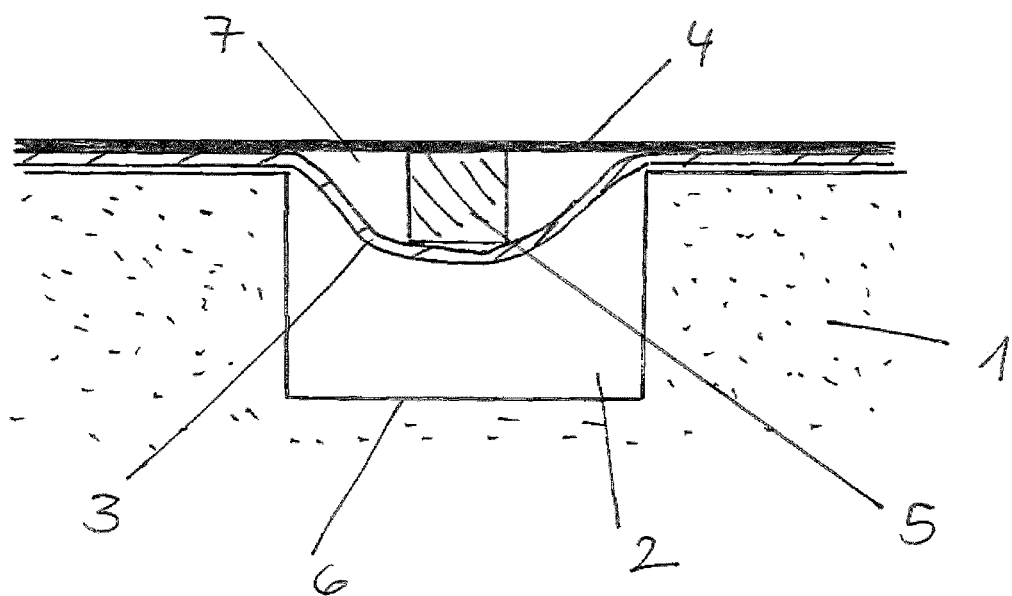
FIG. 1 illustrates a cross-sectional view of a first tacile assembly.

FIG. 1 provides a cross-sectional view of an embodiment of the tactile assembly according to the invention.

The cavity (2) is formed as a recess in the matrix layer (1). A first support layer (3) extends into the cavity. A second support layer (4) covers the opening of the cavity (7) and is placed over the first support layer. On the first support layer (3), the actuator (5) is placed. The bottom of the cavity is indicated by (6).

Due to the arrangement of the tactile actuators of present invention which "float" between the first and second support layer in the cavity, the tactile actuators are not clamped by the matrix material forming the cavity. Even when the vehicle seat is occupied and compressed, the tactile actuator will not, or substantially not, make contact with the bottom or side walls of the cavity, preferably the actuator will (even through the first support layer) not make contact with the bottom and the side walls of the cavity. This avoids spreading of the tactile signal throughout larger areas of the seat.

The tactile assembly of present invention may be incorporated into a vehicle seat, or it may be placed on top of the vehicle seat, thus forming an at least partial cover of the vehicle seat.

The first support layer may be a textile fabric layer which comprises or consists of natural and/or synthetic fibers. The second support layer may be a textile fabric layer which comprises or consists of natural and/or synthetic fibers.

One or a combination of the following fibers may be used in a textile fabric layer: polyester fiber, polyamide fiber or elastomeric fibers (e.g. Spandex).

Alternatively, either of the support layers may be made from foil, film, natural leather or artificial leather.

Preferably, the first support layer is a stretchable textile fabric layer and the second support layer is either also a textile fabric layer or made from leather.

Where a support layer used in the assembly is a textile fabric layer, it may be knitted, braided, woven, non-woven, felted, or a bonded web, preferably the textile fabric layer is knitted.

In one embodiment, the first support layer has a higher elasticity than the second support layer. This means that in the context of the assembly of the invention the first support layer will not decrease the elasticity of the second support layer. Preferably, the first support layer has a high elasticity in multiple, preferably all directions, resulting in stretchability in multiple directions.

In one embodiment the elasticity of the first and the second support layer in combination causes the tactile actuator to be suspended between the first and second support layer.

The first and second support layer are usually placed on top of each other, with the actuator arranged inbetween both layers. In some embodiments, one or more additional layers are at least in some areas inserted between the first and second support layer. Where the first and second support layer are in direct contact with each other, they may be attached to each other, e.g. by glue. This has the advantage that the actuator placed between them is even better fixed in its location.

Additional layers may also be present between the matrix layer and the first support layer or integrated in the matrix layer. For example, a layer comprising seat heating devices (e.g. a mat or pad comprising heating wires) may be placed between the matrix layer and the first support layer.

In a preferred embodiment at least a region of the first support layer and/or the second support layer has a Young's modulus of at least 1 GPa, preferably a Young's modulus of at least 5 GPa, more preferably of at least 10 GPa, preferably said region is localized in an area of the assembly which covers or surrounds the opening of the cavity or which is at least a part thereof. The Young's modulus refers to the modulus of the layer (e.g. the textile fabric), not the fibers comprised in the layer. More preferably, the region of the first and/or second support layer having a higher Young's modulus is the same as the surface area of the cavity opening and placed on top of the cavity opening. In one embodiment, the region of the first and/or second support layer having a Young's modulus of at least 1 GPa is at most 25%, more preferably 10% larger or smaller than the surface area of the cavity opening.

Preferably, the Young's modulus of these regions is at least twice as high as that of the remaining support layer.

The support layer region having a higher modulus may be realized by incorporating locally different materials into the support layer or by forming the support layer in a different manner (e.g. different weaving or knitting pattern).

Alternatively, material having a Young's modulus of at least 1 GPa, preferably of a Young's modulus of at least 5 GPa, more preferably of at least 10 GPa may be attached to the first and/or second support layer at the respective regions. Alternatively, the above described regions may be made from a material having a higher density than the remaining support layer (i.e. the part of the support layer not in close proximity to the cavities).

Alternatively, the above described regions may also consist of material having a lower Young's modulus than the surrounding parts of the second support layer. This may be realized by replacing parts of the second support layer in these regions with a textile fabric having a lower Young's modulus.

Where the vehicle seat is covered in leather, an alternative embodiment may be used. Leather usually has a Young's modulus of ca. 0.1-0.5 GPa, enabling spreading of the tactile signal over the vehicle seat.

In this embodiment, a layer of material having a Young's modulus of at least 1 GPa is placed between the first and second support layer such that the material at least partly surrounds the opening of the cavity, e.g. as a continuous or segmented ring for embodiments where the opening is shaped as a circle.

Preferably, in this embodiment, the matrix layer at the rim of the cavity has a small recess to accommodate the extra layer or the extra layer may be attached to the second support layer and is arranged to extend into the cavity.

Figure 2:
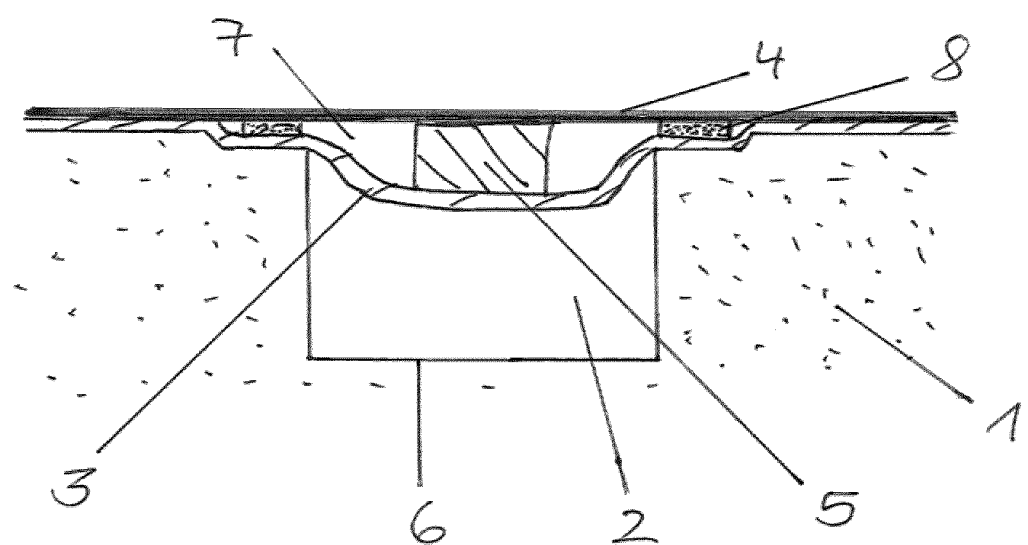
FIG. 2 illustrates a cross-sectional view of a second tactile assembly.

An example of this embodiment is shown in FIG. 2.

The cavity (2) is a recess in the matrix layer (1). A first support layer (3) extends into the cavity. A second support layer (4) covers the opening of the cavity (7) and is placed over the first support layer. On the first support layer (3), the actuator (5) is placed. The bottom of the cavity is indicated by (6). Inbetween the first textile fabric layer (3) and the second support layer (4) and at the rim of the cavity (2) a high modulus material (8) is placed.

In this embodiment the leather covering of the seat may be employed as second support layer (4).

This way of introducing locally a material having a Young's modulus of at least 1 GPa into the assembly according to the invention may also be used for assemblies where the first and/or second support layer is a fabric textile layer or made from film, foil or artificial leather.

In an embodiment of the invention, the matrix layer is a foam layer.

The foam may be any suitable foam, e.g. polyethylene foam or polyurethane foam. The foam layer may also comprise a combination of foam materials.

The cavity of the assembly is formed in the matrix layer. In the context of this description, the opening of the cavity is directed towards the surface of the vehicle seat which is in contact with the occupant of the seat, the bottom of the cavity is opposite to the opening and the side walls define the shape of the cavity between the opening and the bottom. The depth of the cavity is the shortest distance between the bottom and the opening.

The cavity may have any shape, preferably the cavity is cylindrical with a circular or oval opening and bottom. Alternatively, the cavity may be cubic or cone shaped and have an elliptical or rectangular opening and bottom.

The cavity opening and the shape of the cavity should be large enough to accommodate the actuator comfortably, preferably such that through the first support layer the actuator makes no contact with the side walls and/or bottom, and provide a sufficiently large tactile vibration area to the seat occupant.

In a preferred embodiment, the cavity opening has a surface area in the range of 3 to 80 cm$^2$, preferably in the range of 7 to 50 cm$^2$, more preferably in the range of 12 to 30 cm$^2$.

Preferably, the surface area of the opening of the cavity is at least 50% larger than the projected surface area of the actuator facing the opening, preferably the surface area of the cavity opening is at least 100% larger than the projected surface area of the actuator facing the opening.

The depth of the cavity has to be large enough to accommodate the tactile actuator, such that the tactile actuator is not in contact with the bottom of the cavity, even when the assembly is compressed by an occupant of the seat.

In one embodiment, the cavity has a depth in the range of 0.5 to 5 cm, preferably in the range of 1 to 3 cm.

Preferably, the depth of the cavity is at least 50% larger than the height of the actuator, preferably the depth of the cavity is at least 100% larger than the height of the actuator. The depth may be chosen dependent on the combined elasticity of the support layers and the density of the foam.

In the embodiment where the assembly is placed in a cushion or cover arranged on top of the vehicle seat, the assembly comprises fixing means, e.g. a separate stretchable textile layer or the first and second support layers are sufficiently elastic to allow attachment to the vehicle seat. Besides these materials and the matrix layer, such a cushion or cover may comprise additional materials to make the cushion or cover more comfortable, e.g. additional foam layers.

Preferably, the assembly for placing on the vehicle seat is foldable. This may be realized by dividing the assembly into separate segments. In such embodiment, the support layers and/or the matrix layer do not have to be continuous. Preferably, each segment of the assembly comprises at least one actuator.

Where the assembly is incorporated into the vehicle seat or below the seat cover, parts which are regularly part of the vehicle seat may be employed as substituents of the assembly according to the invention. For example, the matrix layer of the tactile assembly may be formed by a part of the upholstery of the seat and the cavities are cut into it.

For example, the second support layer may be formed by the outmost covering layer of the vehicle seat or it may be a separate layer.

Alternatively, an assembly comprising a matrix layer and actuators may be incorporated in the seat under the textile or leather layer covering the seat.

In embodiments where the vehicle seat comprises a seat heating system, the heating pads incorporated into the seat may be used as first textile layer and the actuators may be placed upon the heating pads.

Also where the assembly is incorporated into the vehicle seat, the tactile assembly according to the invention may be partitioned into multiple segments. In such embodiment, any one or multiple layers of the assembly may be discontinuous.

The tactile actuator of the assembly is preferably a vibration motor.

The tactile actuator may comprise a housing surrounding the motor. The movement of the actuator may be predominantly in a direction parallel or perpendicular to the extension direction of the second support layer.

Preferably, the vibration motor is arranged such that the direction of the vibration waves is perpendicular to the extension direction of the second support layer. The actuators may be selected from eccentric rotating mass (ERM) motors and linear resonance actuators (LRA).

The actuator is attached to the first support layer to keep it in place, e.g. by glue, stitching or a hook-loop fastening system such as Velcro®.

Optionally, the actuator may also be attached to the second support layer, also by e.g. glue, stitching or hook-loop fastening systems.

In another embodiment, the actuator is embedded in a molding composition which allows to adapt the shape of the actuator. The molding composition may be applied to the actuator by injection molding. Optionally, during molding, the molding composition, while still moldable, may be used to attach the actuator to the first and/or second support layer.

Preferably, the molding composition is a thermoplastic or thermoplastic elastomeric resin, e.g. a polyamide resin. These resins may be hot-melted and shaped as desired.

For example, by embedding the actuator in the molding composition, the vibrating mass including the actuator is enlarged. Also, the shape of the vibrating mass including the actuator may be adapted as desired, e.g. it may be shaped peaked or spiky.

The molding composition may also cover the cable entry points of the actuator to provide improved protection against breaking.

The tactile assembly of the invention provides tactile signals and hence potentially instructions to the occupant of the vehicle seat, preferably of navigational or alerting nature.

The instructions are provided by a software via a control unit. The control unit is connected to the at least one actuator of the tactile assembly. For the connection between the control unit and the actuators, between multiple actuators, between the actuators and the actuator driver boards and between the actuator driver boards and the control unit cables, wires or stretchable conductive circuits may be used. Stretchable conductive materials based on conductive ink have been described in US2014/318699 A1. However, also other stretchable conductive materials or circuits (also commonly known as flexible conductive materials) may be used, e.g. stretchable conductive materials based on encapsulating materials surrounding a conductor (e.g. a thin metal film or ribbon, in particular a copper film or ribbon, or conductor based on a conductive polymer or gel). The stretchable conductive circuits may be in the form of textile material and may be directly attached to the first and/or second support layer.

From each single actuator the connection, e.g. the electrical cable, may run partially between the first and the second layer and then pass through a hole or slit in the first support layer into slits in the foam which lead the cable to an actuator driver board placed away from the occupant seating surface (e.g. at the periphery of the matrix layer). Each actuator is usually connected to a single actuator driver board. The actuator driver boards are connected via wires in a bus topography, i.e. they are connected to a common wire. One or more of such bus topographies comprising each at least one actuator and actuator driver board are connected to the control unit. The actuator driver boards may be placed under or beside the matrix layer or adjacent to the actuator, e.g. connected to the actuator by the molding composition.

Therefore, in one embodiment, the assembly according to the invention is additionally provided with connections connecting the at least one actuator with an actuator driver board and finally with a control unit, where the connection may be a wire or a stretchable conductive circuit.

The control unit may be part of the vehicle seat or installed in close proximity to the vehicle seat. It may e.g. be placed under the seat.

The control unit receives signals from a software that provides the information, e.g. alerts, navigational or vehicle status information. Based on the signal input from the software, the control unit operates the at least one actuator.

The software may be part of an in-car information system, e.g. the navigation system and/or an in-car warning system which processes internal (e.g. awareness status of the driver) or external (e.g. pending collision) information.

The control unit is connected (either wireless or wired) to the software. In the embodiment where a wireless connection is made to the software of the in-car information system, an energy source, e.g. a battery will be included in the tactile system.

The control unit usually comprises control hardware with firmware and equipment for connecting it with the information system of the car, e.g. a Bluetooth module and/or an USB connector.

The control unit interprets the instructions provided by the software and activates the corresponding at least one actuator. Preferably, multiple actuators are activated in a spatio-temporal pattern which provides specific information or instructions to the occupant of the vehicle seat, e.g. relating to navigational information, status information of the vehicle or alerts.

In a preferred embodiment, the control unit comprises an on/off switch which is arranged such that it can be operated by the seat occupant (usually the driver) when driving.

Therefore, present invention is also directed to a tactile system comprising software, a control unit and the tactile assembly of this invention as described in any of the embodiments above.

Preferably, the tactile assembly of instant invention comprises a number of tactile actuators which are placed in a spatial configuration. Preferably at least 2, more preferably at least six tactile actuators are placed in or on top of the vehicle seat. Usually, the tactile actuators are placed in the bottom part of the seat (or on top of it). Alternatively or additionally, tactile actuators may be placed in (or on top of) the back of the seat (especially the lower back) and/or the arm rests.

In the bottom part of the seat, usually, the tactile actuators will be placed in at least two (more or less parallel) rows, running from the front of the seat to the back of the seat and roughly corresponding to the position of the legs on the seat.

The tactile assembly, tactile system and the vehicle seat according to the invention may be placed into various vehicles, including passenger cars, buses, vans and lorries.

The tactile assembly according to the invention is particularly suited for special purpose vehicles, as e.g. ambulances, fire trucks, police cars, as a replacement of or in addition to audio-based driver information systems relating to e.g. navigational instructions, alerts and vehicle status information.

Especially under pressure, in stressful situations, the driver of the vehicle may benefit from receiving tactile input for navigation and/or alerts.

In the following, non-limiting example one embodiment of the invention is further illustrated.

EXAMPLE

The following example relates to a tactile assembly according to the invention which is integrated into a car seat. First a module is assembled that contains six vibration motors and their hardware drivers, subsequently this is fitted into a car seat.

The module is created by using a Velcro enabled stretchable continuous textile as the first support layer. On top of this, six perpendicularly vibrating, encased vibration motors (cylindrical motors having a diameter of 7 mm and a length of 24 mm) are attached with 1 cm diameter Velcro rounds. These Velcro rounds are attached to the vibration motor with epoxy resin. The vibration motors are arranged in two columns of each three motors. The distance between the columns is ca. 23 cm and the distance between the motors (center to center) within each column is ca. 8 cm.

Supple wires run in a winding pattern from each of the vibration motors to each matching driver hardware printed circuit board (one driver hardware printed circuit board per vibration motor). The driver hardware printed circuit boards are thus single actuator driver boards. They are attached with Velcro to the first supporting layer and will be located under the back rest in the final assembly. From the driver boards a cable runs to the encased control module board (the control unit). The second supporting layer is sewn to the first supporting layer and consists of a stretchable, thin fabric.

To integrate the module into the car seat, the cover is removed from the car seat cushion. The second support layer of the module is glued with spray glue to the inside of the cover. From the car seat foam 6 cylindrical holes are cut, matching the locations of the vibration motors. The holes have a diameter of 5 cm and a depth of 2 cm. The vibration motors are arranged such that their smallest dimension (7 mm) extends in to the holes. The cover including the module is placed back and fastened to the car seat cushion. The control module connected to the driver hardware printed circuit boards is attached to the car seat carriage with tie wraps.

The invention claimed is:

1. A tactile assembly for a vehicle seat or for a cover placeable on a vehicle seat comprising
    at least one tactile actuator,
    at least two support layers comprising a first support layer and a second support layer, and
    a matrix layer comprising at least one cavity, wherein
    the tactile actuator is arranged on the first support layer,
    the first support layer is arranged to extend into the cavity without contacting an interior surface of the cavity,
    the tactile actuator is arranged on the first support layer in the cavity such that the tactile actuator makes no contact with the interior surface of the cavity,
    an opening of the cavity is covered by the second support layer, and
    the first support layer and the second support layer extend over at least part of a surface of the matrix layer which surrounds the opening of the cavity.

2. The tactile assembly according to claim 1 wherein the first support layer has a higher elasticity than the second support layer.

3. The tactile assembly according to claim 1 wherein at least a region of the first support layer and/or the second support layer fabric has a Young's modulus of at least 1 GPa.

4. The tactile assembly according to claim 1 wherein the matrix layer is a foam layer.

5. The tactile assembly according to claim 1 wherein the cavity opening has a surface area in the range of 3 to 80 cm2.

6. The tactile assembly according to claim 1 wherein the cavity has a depth in the range of 0.5 cm to 5 cm.

7. The tactile assembly according to claim 1 additionally provided with connections connecting the tactile actuator with a control unit.

8. The tactile assembly according to claim 1, wherein the tactile assembly is configured to transmit navigation and/or warning instructions to an occupant of the vehicle seat.

9. A tactile system comprising software, a control unit and the tactile assembly of claim 1.

10. A vehicle seat or vehicle seat cover comprising the tactile system according to claim 9.

11. A vehicle seat or vehicle seat cover comprising the tactile assembly according to claim 1.

12. The vehicle seat or vehicle seat cover according to claim 11 wherein the tactile assembly is arranged at or in the bottom and/or back part of the vehicle seat or in the vehicle seat cover.

13. The tactile assembly according to claim 1 wherein the second support layer is arranged to not be in contact with the bottom of the cavity.

14. The tactile assembly according to claim 1 wherein the second support layer is arranged so that the tactile actuator is between the bottom of the cavity and the second support layer.

15. The tactile assembly according to claim 1 wherein the tactile actuator is not clamped by the matrix layer.

16. The tactile assembly according to claim 1 wherein the first support layer does not contact any interior surface of the cavity.

17. The tactile assembly according to claim 1 wherein the tactile actuator makes no indirect contact with the interior surface of the cavity, indirect contact being contact through another layer of material.

18. A tactile assembly for a vehicle seat or for a cover placeable on a vehicle seat comprising
    a tactile actuator,
    a first support layer and a second support layer, and
    a matrix layer comprising at least one cavity, wherein
    the tactile actuator is suspended between the first support layer and the second support layer within the cavity,
    the first support layer extends into the cavity without contacting an interior surface of the cavity,
    an opening of the cavity, the first support layer and the tactile actuator are covered by the second support layer, and
    the first support layer and the second support layer extend over at least part of a surface of the matrix layer which surrounds the opening of the cavity.

19. The tactile assembly according to claim 18 wherein the first support layer does not contact any interior surface of the cavity.

20. The tactile assembly according to claim 18 wherein the tactile actuator makes no indirect contact with the interior surface of the cavity, indirect contact being contact through another layer of material.

* * * * *